(12) United States Patent
Mayernick

(10) Patent No.: US 12,220,080 B2
(45) Date of Patent: *Feb. 11, 2025

(54) INSULATED POCKET BUN

(71) Applicant: Robert Mayernick, South Bend, IN (US)

(72) Inventor: Robert Mayernick, South Bend, IN (US)

(73) Assignee: Robert Mayernick, South Bend, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/228,026

(22) Filed: Jul. 31, 2023

(65) Prior Publication Data
US 2023/0371740 A1 Nov. 23, 2023

Related U.S. Application Data

(60) Continuation of application No. 15/464,838, filed on Mar. 21, 2017, now Pat. No. 11,744,255, which is a continuation-in-part of application No. 14/152,074, filed on Jan. 10, 2014, now abandoned, which is a division of application No. 13/553,868, filed on Jul. 20, 2012, now Pat. No. 8,870,151.

(51) Int. Cl.
A47J 37/01 (2006.01)
A21B 3/13 (2006.01)
A21D 8/06 (2006.01)
A21D 13/32 (2017.01)

(52) U.S. Cl.
CPC ............... *A47J 37/01* (2013.01); *A21D 8/06* (2013.01); *A21D 13/32* (2017.01); *A21B 3/133* (2013.01); *A21B 3/137* (2013.01); *A21B 3/139* (2013.01)

(58) Field of Classification Search
CPC ............ A47J 37/01; A21D 13/32; A23D 8/06
See application file for complete search history.

(56) References Cited

U.S. PATENT DOCUMENTS

| | | | |
|---|---|---|---|
| 1,809,383 | A | 6/1931 | Heyboer |
| 2,078,102 | A | 4/1937 | Siela |
| 2,330,410 | A | 9/1943 | Cyr |
| 3,379,120 | A | 4/1968 | Fogle |
| 4,275,082 | A | 6/1981 | Dougan |
| 4,348,949 | A | 9/1982 | Selleck |
| 4,656,935 | A | 4/1987 | Kukura |
| 5,226,352 | A | 7/1993 | Savage |
| 8,870,151 | B1 | 10/2014 | Mayernick |
| D755,468 | S | 5/2016 | Elliott |
| 2006/0019014 | A1 | 1/2006 | Linforth et al. |

FOREIGN PATENT DOCUMENTS

WO 2004098295 A1 11/2004

Primary Examiner — Stephanie A Cox
(74) Attorney, Agent, or Firm — Sanders Pianowski, LLP

(57) ABSTRACT

The present disclosure describes a bun having a pair of cavities formed therein. The cavities include inner walls which are browned. The cavities form segregated areas which are suitable for receiving separate fillings for making a sandwich. The bun has an insulating wall separating adjacent cavities. The insulating wall may be thicker than the other walls in the bun or may further contain cavities or through-holes to further reduce thermal transfer between any fillings with different temperatures that may be located in the cavities. The browned inner walls in each of the cavities help prevent the bun from getting soggy.

15 Claims, 13 Drawing Sheets

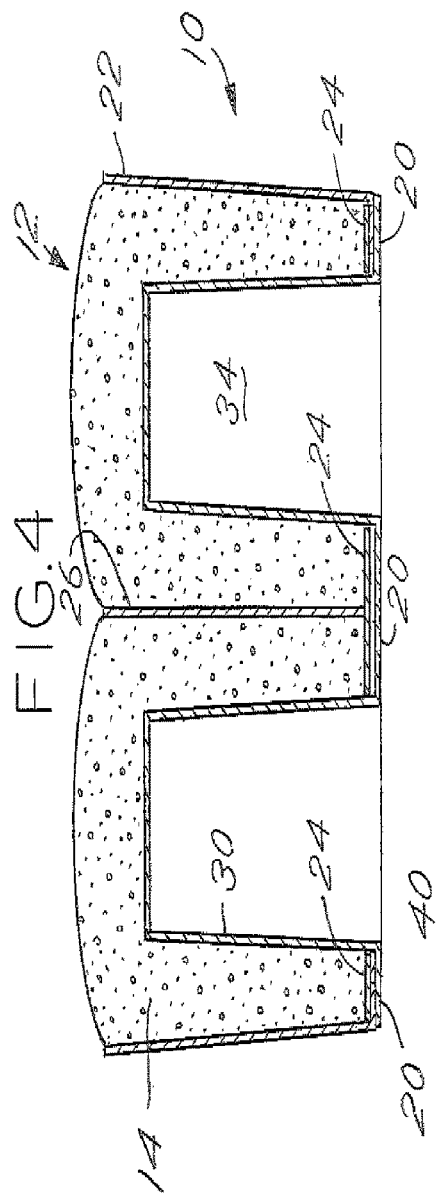
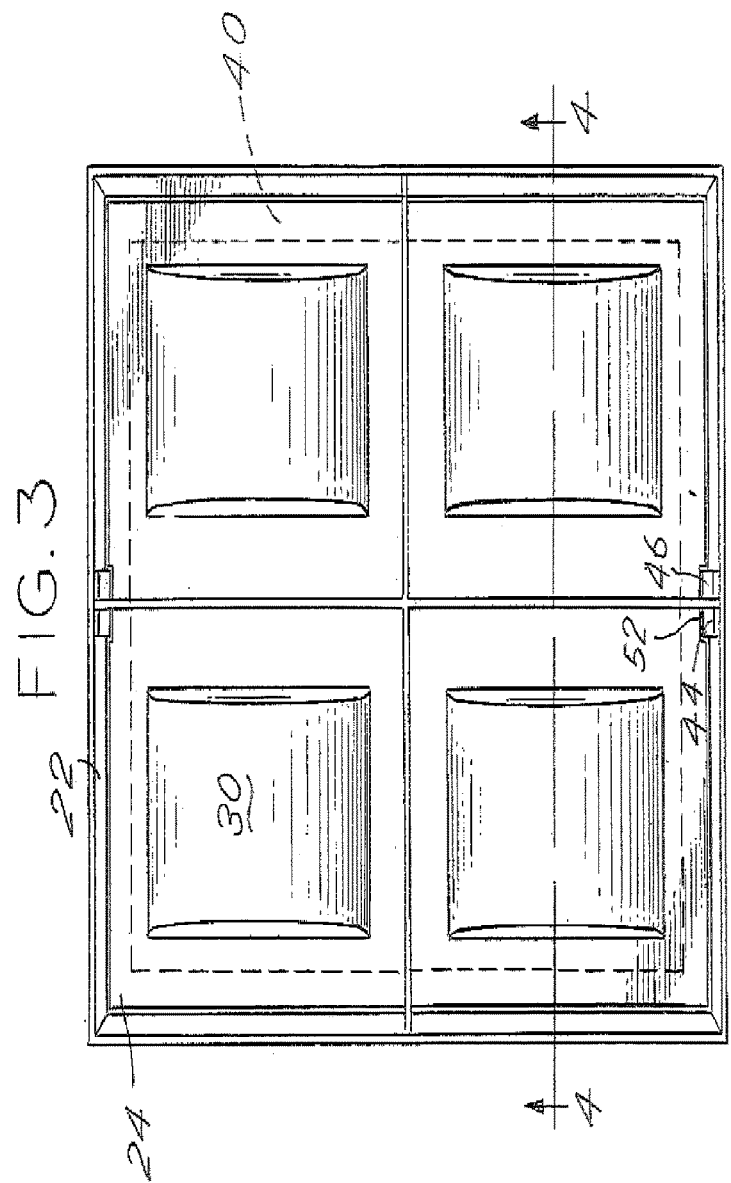

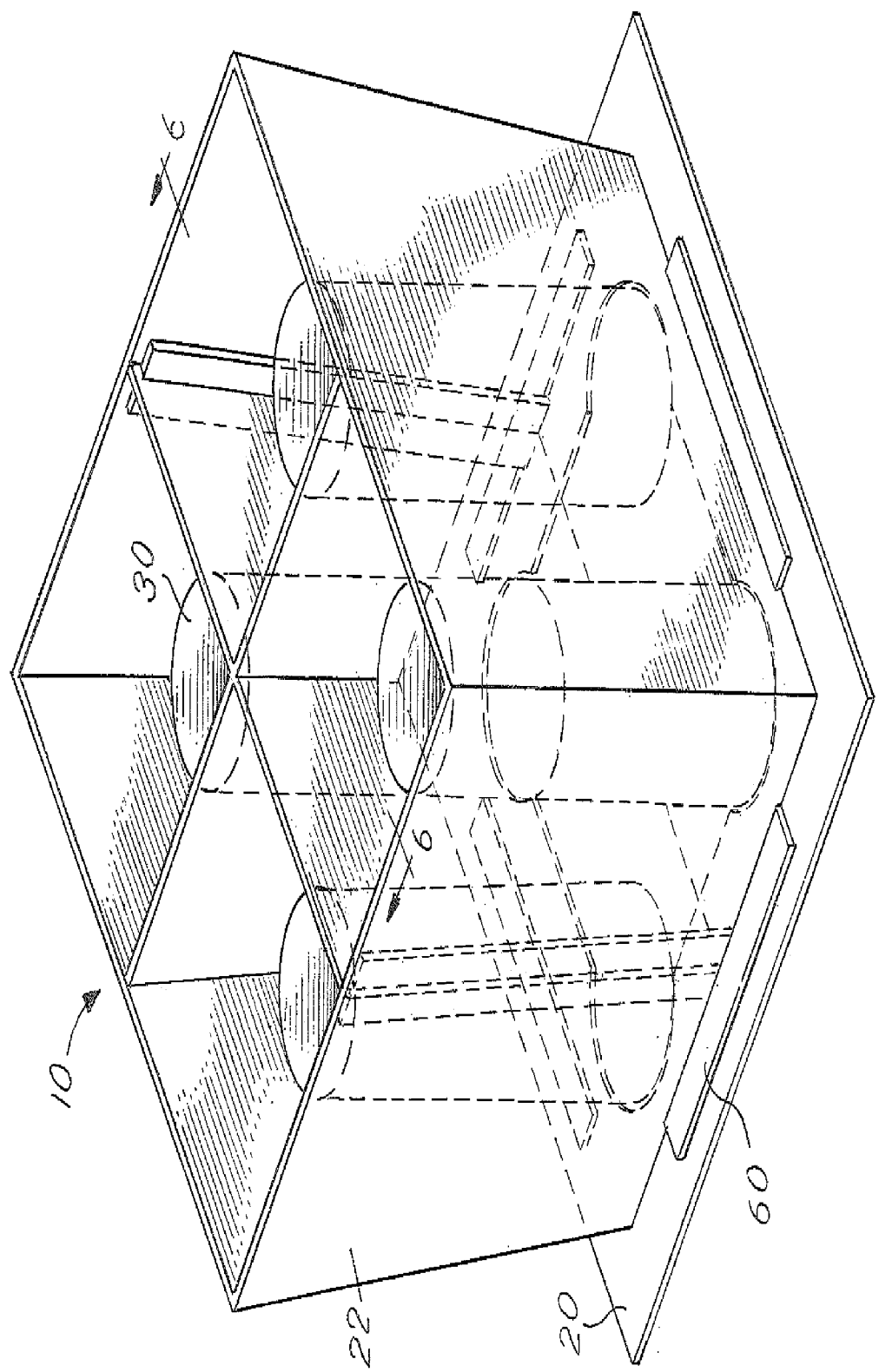

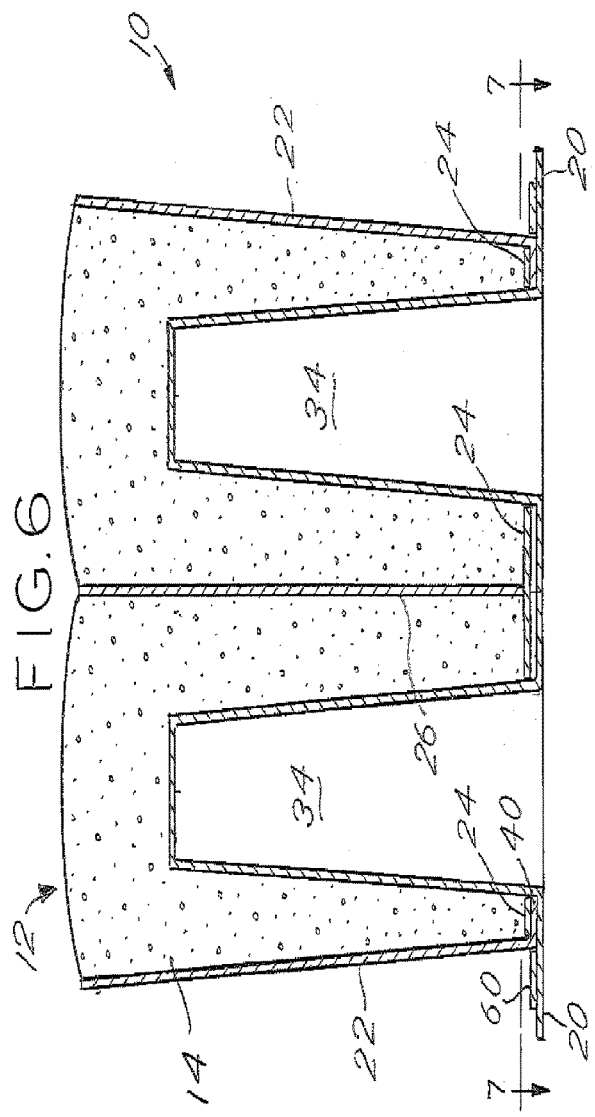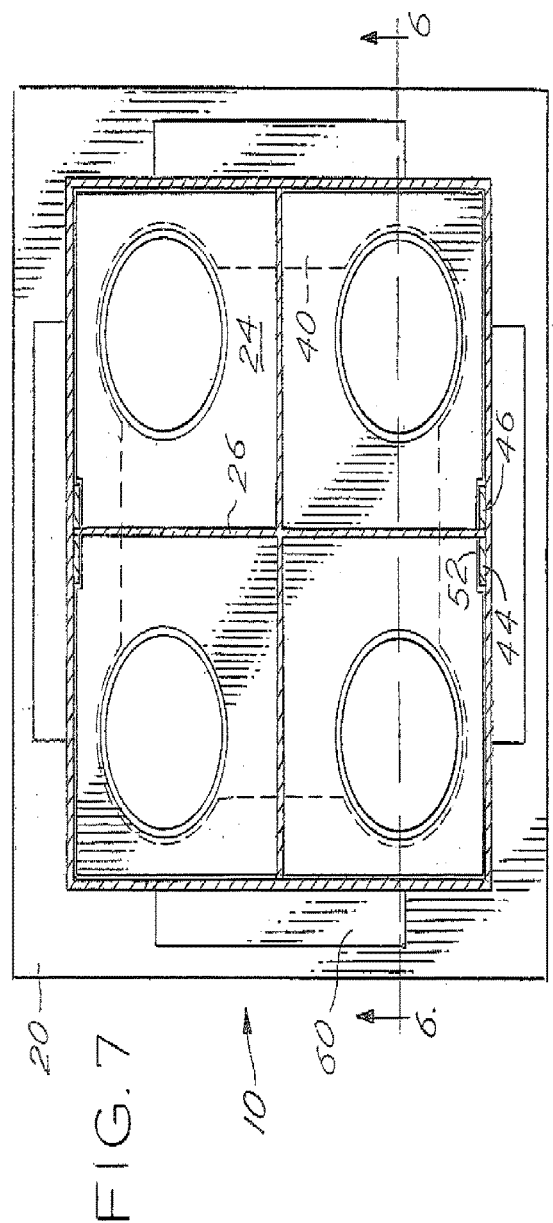

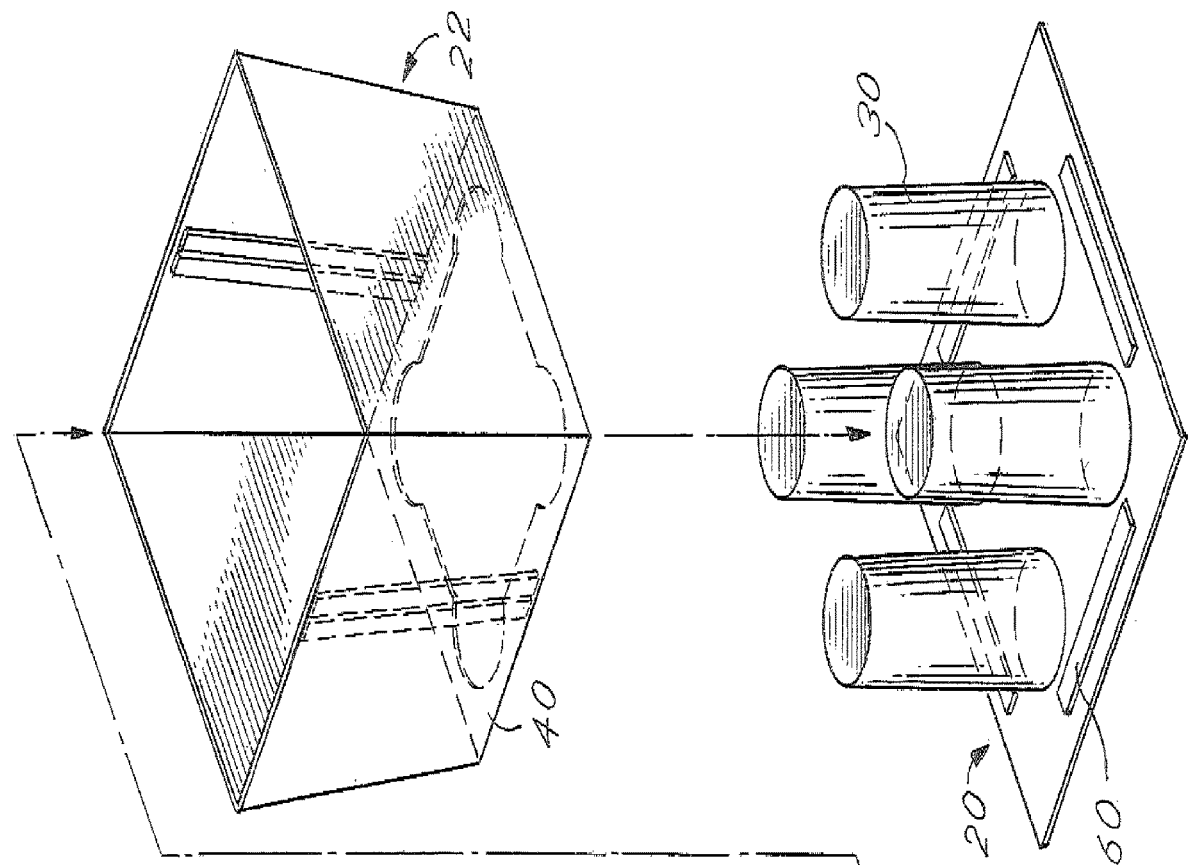
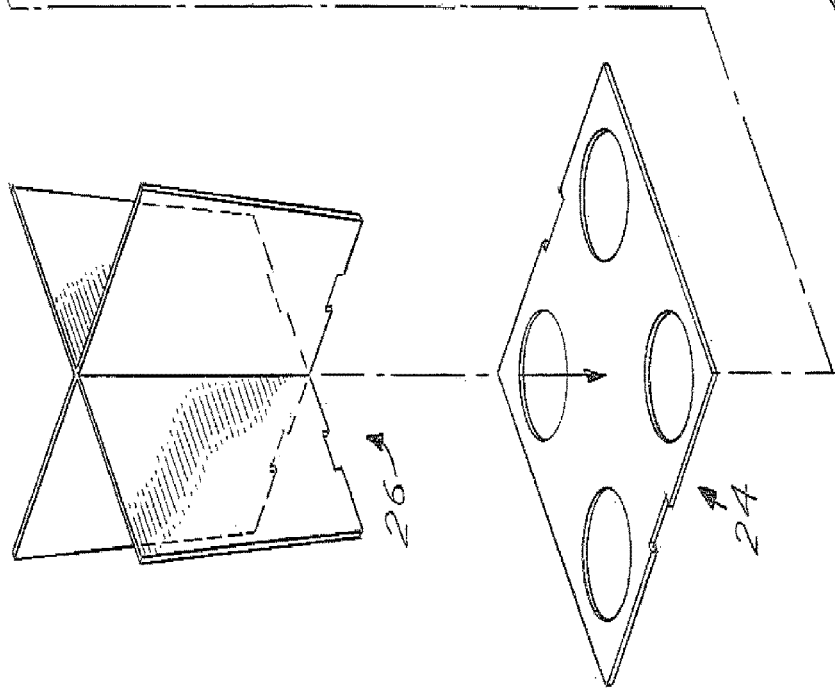
FIG.8

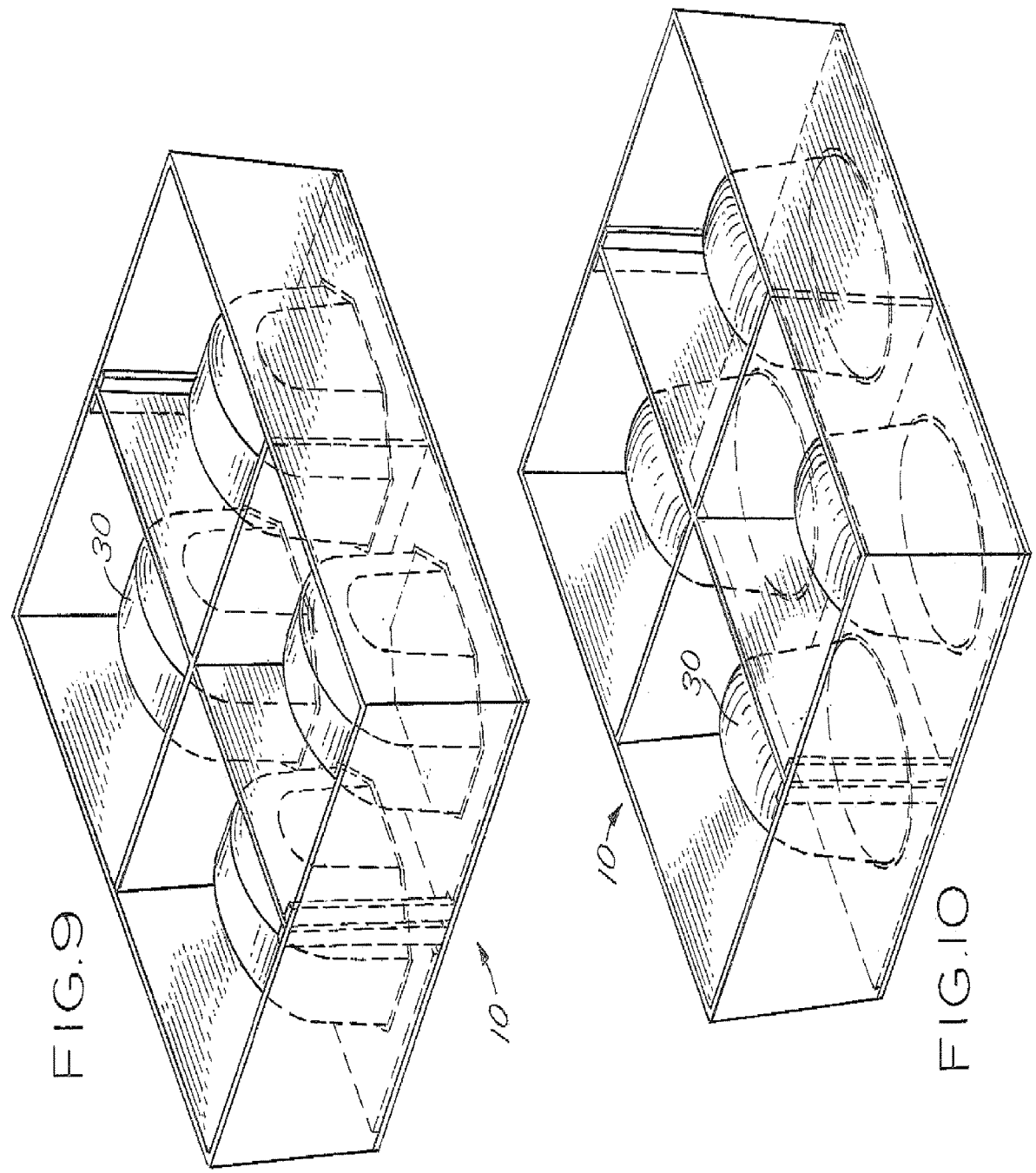

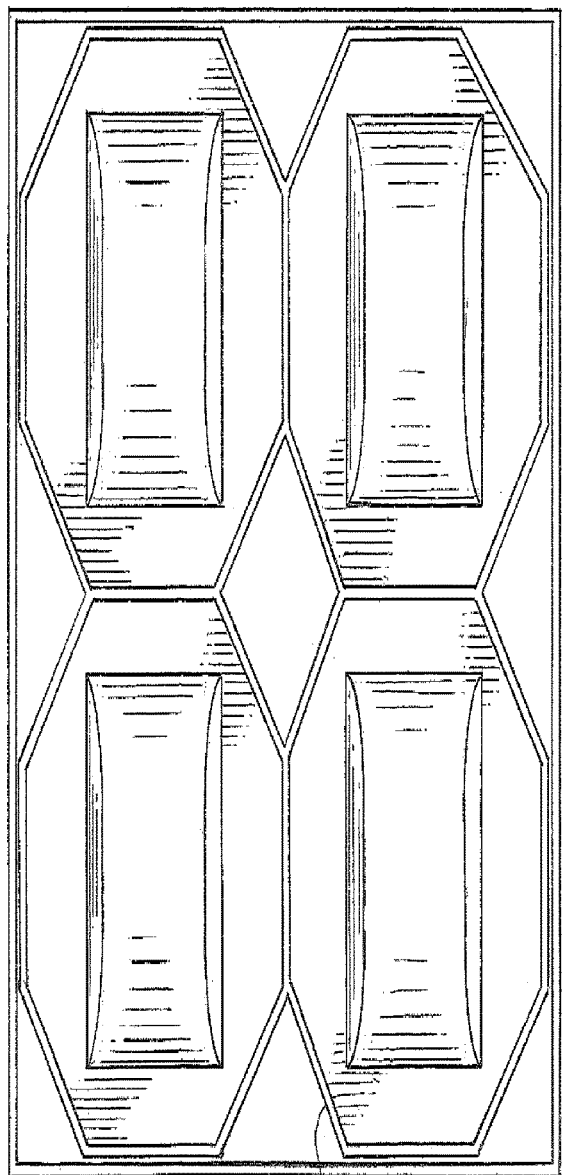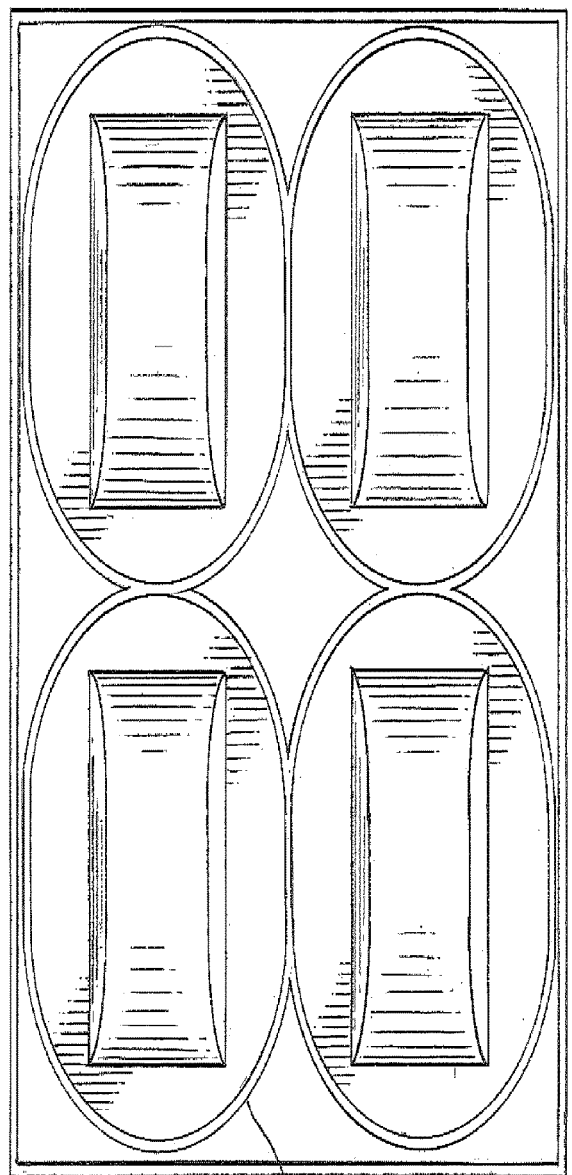

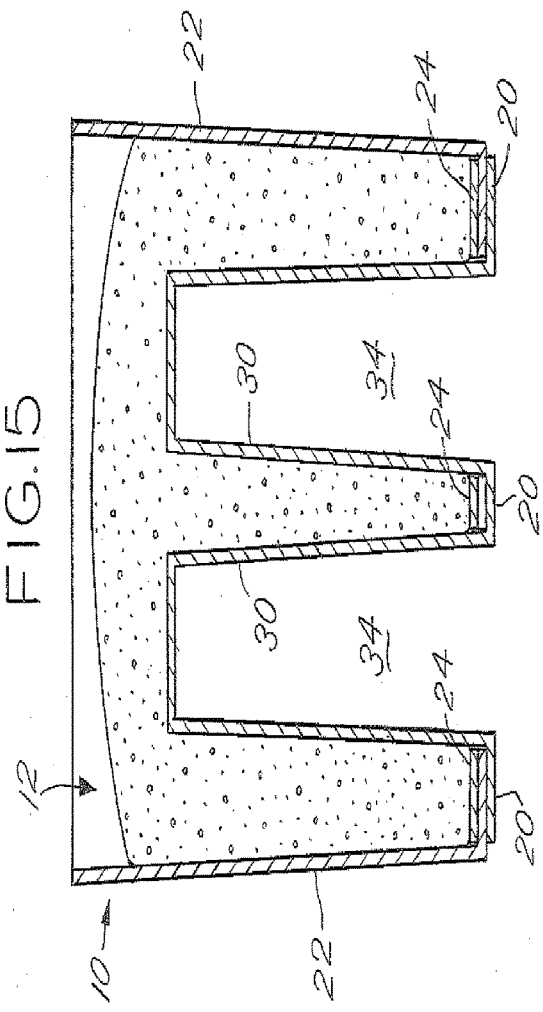
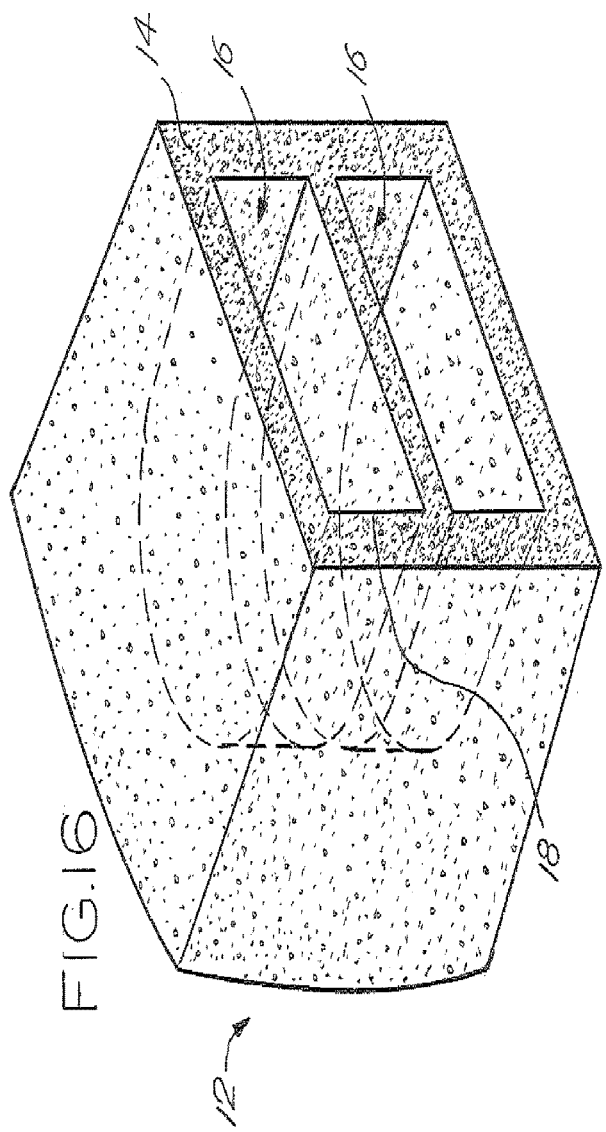

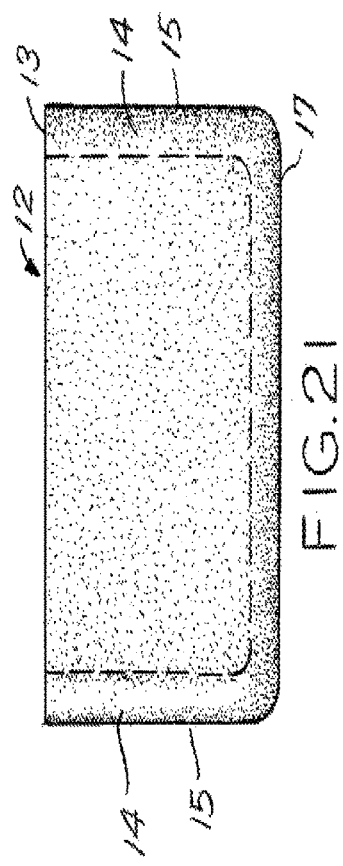
FIG.21
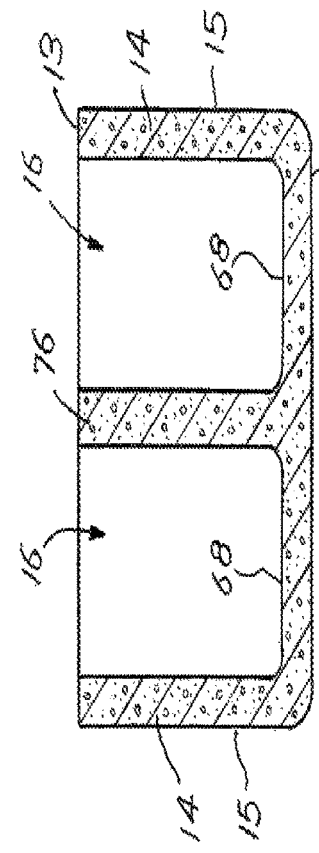
FIG.22
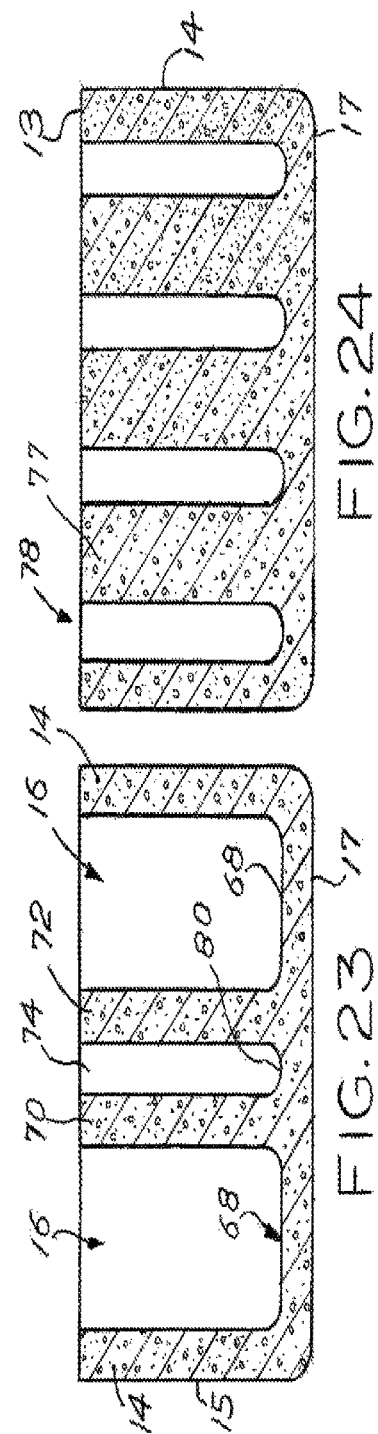
FIG.23
FIG.24

INSULATED POCKET BUN

CROSS REFERENCE TO RELATED APPLICATIONS

This application is a Continuation of U.S. application Ser. No. 15/464,838 filed Mar. 21, 2017, which is a Continuation-in-Part of U.S. application Ser. No. 14/152,074 filed Jan. 10, 2014, which is a divisional of U.S. application Ser. No. 13/553,868 filed Jul. 20, 2012, the disclosure of which is hereby incorporated by reference.

BACKGROUND OF THE INVENTION

A typical sandwich is formed having a filling disposed between two pieces of bread. A hamburger is one common sandwich, with a ground beef patty, vegetables and condiments disposed between an upper and lower bun. Sometimes the bread is hinged, such as is used with a hotdog or sausage. The common failing of these types of sandwiches is that they can be difficult to eat tidily when on the go—the sandwich filling can leak out of the bread while being eaten. As such an improved bun is needed for containing sandwich filling. The disclosure provided herein describes an improved pan for baking a bun suitable for use in making a variety of sandwiches (including, but not limited to, hotdogs, sausages, hamburgers, sub sandwiches, loose meat sandwiches, among many others).

SUMMARY OF THE INVENTION

The present disclosure describes a pan for preparing an improved bun suitable for making various types of sandwiches. The pan described herein is composed of a base plate, a housing, an ejector plate and a divider. The pan, when assembled, is shaped to form a pocket bun therein. The pan is designed to be disassembled in a way to allow ready ejection of the pocket bun from the pan.

The pan may include a single chamber for producing a single bun, or multiple chambers for producing multiple buns from a single pan. One chamber may include a single male mold for producing a bun having a single cavity, or multiple male molds for producing a bun having multiple cavities. The divider separates the chambers and may include openings to allow buns in adjacent chambers to form a baked connector therebetween for holding the buns together during packaging.

The pan of the present disclosure includes further improvements over previous pans, including providing a pan with means for ejecting deep-draw goods from the pan such as through a pneumatic system or use of ejection pins. In one configuration, the pan of the present disclosure produces a bun having a plurality of cavities, such that food stuffs are independently insertable into each cavity. In an additional configuration, the shape of either the exterior of the bun or the cavity of the bun is formed with a distinctive shape so as to provide unique brand-identifying capabilities.

BRIEF DESCRIPTION OF THE DRAWINGS

FIG. 3 is a top view of the pan of FIG. 1;

FIG. 4 is a sectional side view of the pan of FIG. 3 as taken along line 4-4 and shown housing two buns;

FIG. 5 is a perspective view of a pan suitable for forming one or more hotdog-accommodating pocket buns;

FIG. 6 is a sectional side view of the pan of FIG. 7 as taken along line 6-6 shown housing two buns;

FIG. 7 is a top view of the pan of FIG. 5;

FIG. 8 is an exploded view of the pan of FIG. 5;

FIG. 9 is a perspective view of a pan showing the male mold having an octagon-shaped cross-section;

FIG. 10 is a perspective view of a pan showing the male mold having an oval-shaped cross-section;

FIG. 13 is a top view of a pan showing a divider providing an octagon-shaped outer cross-section to the buns;

FIG. 14 is a top view of a pan showing a divider providing an oval-shaped outer cross-section to the buns;

FIG. 15 is a sectional side view of a pan for forming a single bun having two cavities;

FIG. 16 is a perspective view of a bun formed from the pan of FIG. 15;

FIG. 21 is a side view of the bun shown in FIG. 17;

FIG. 22 is a section view 22-22 of the bun in FIG. 19;

FIG. 23 is a section view 23-23 of the bun in FIG. 19;

FIG. 24 is a section view 24-24 of the bun in FIG. 20; and

DESCRIPTION OF THE PREFERRED EMBODIMENT

Figure 1:
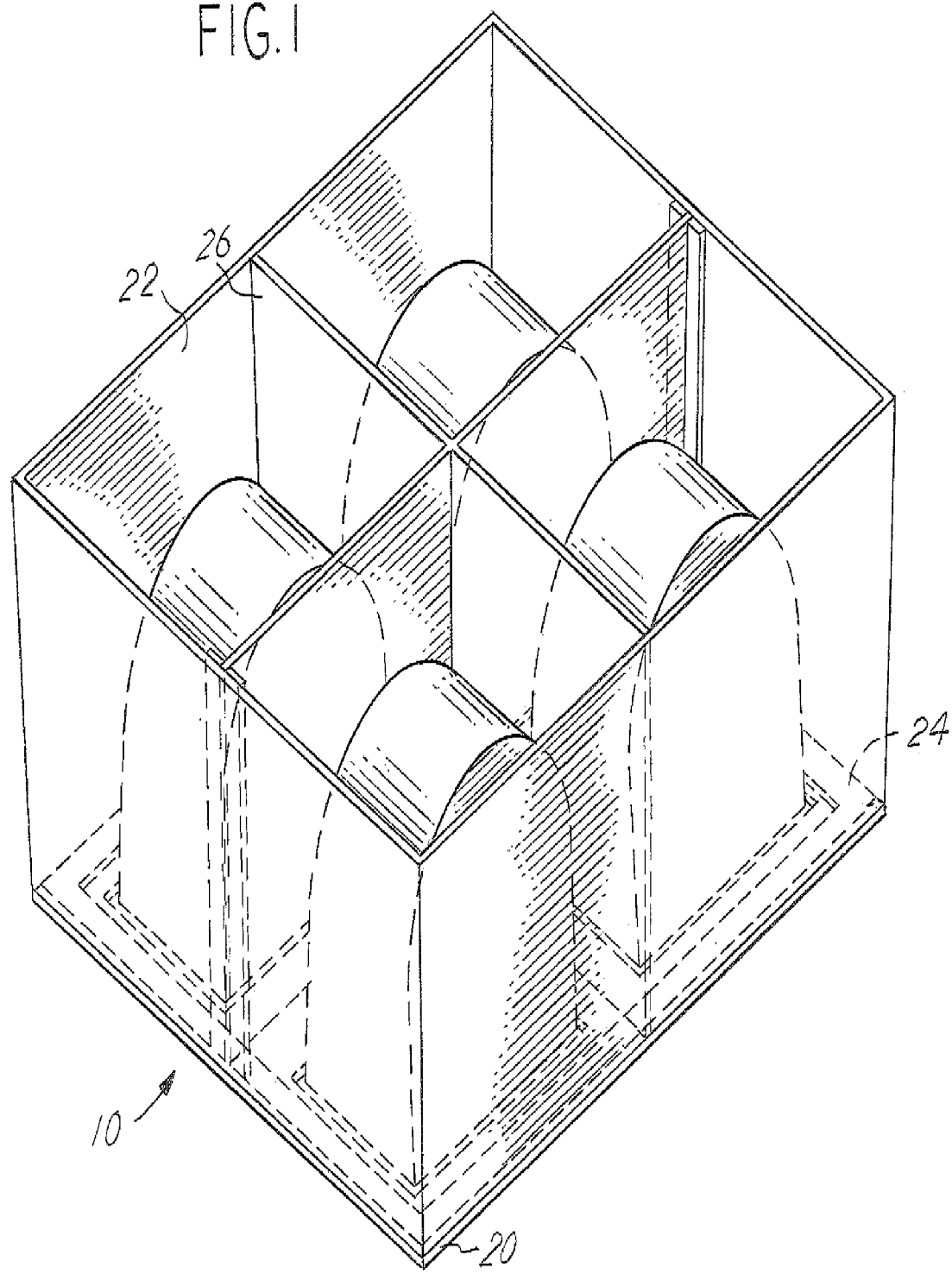
FIG. 1 is a perspective view of a pan suitable for forming one or more hamburger-accommodating pocket buns.

The present disclosure describes a pan 10 suitable for preparing a pocket bun 12. Pocket bun 12 is a molded object one embodiment of which is shown in FIG. 16, such as a food product or bun, formed having a wall 14 which defines a cavity 16 (other embodiments of bun 12 are shown in side-view in FIGS. 4, 6, 11, 12, and 15, where FIG. 16 shows a two-cavity bun, and the remaining figures show single-cavity buns). An opening 18 is formed at the flat surface 13 through wall 14 and allows access to cavity 16. Cavity 16 and opening 18 together form an open mouth in pocket bun 12, with a cavity 16 suitable for carrying food products, such as a hamburger, a hotdog, cold cuts, or any other food products and related condiments and dressings. The cavity 16 is shaped to hold fillings that would normally spill or ooze as the user attempts to eat the bun 12. The cavity 16 is shown as a cup or bowl shape with side walls 14 that meet at the same flat surface 13. The present disclosure is directed to pan 10, any references to pocket bun 12 should not be seen as limiting the uses of pan 10. It is understood that bun 12 formed in pan 10 is suitable for carrying a variety of sandwich fillings, and any reference to a specific type of filling is merely illustrative and does not limit the use of the bun. For example, any reference to hotdogs is only to illustrate the general shape of the bun, not to limit the bun from being used with other types of fillings. As shown in FIGS. 16-24, the bun 12 has a flat surface 13, side surfaces 15, and an end surface 17 that is located opposite the flat surface 13. The flat surface 13 is shown as a planar surface but other surface contours are possible. The side surfaces 15 connect the end surface 17 to the flat surface 13.

As described herein, pan 10, and associated parts described in detail below, are referred to as having upper and lower ends. These designations are for ease of reference herein, with the upper end referring generally to the open top of pan 10, and the lower end referring generally to the base of pan 10 opposite the open top. It is understood that as used, pan 10 is positionable in any number of orientations, and as such any reference to upper and lower is not seen as limiting.

Figure 2:
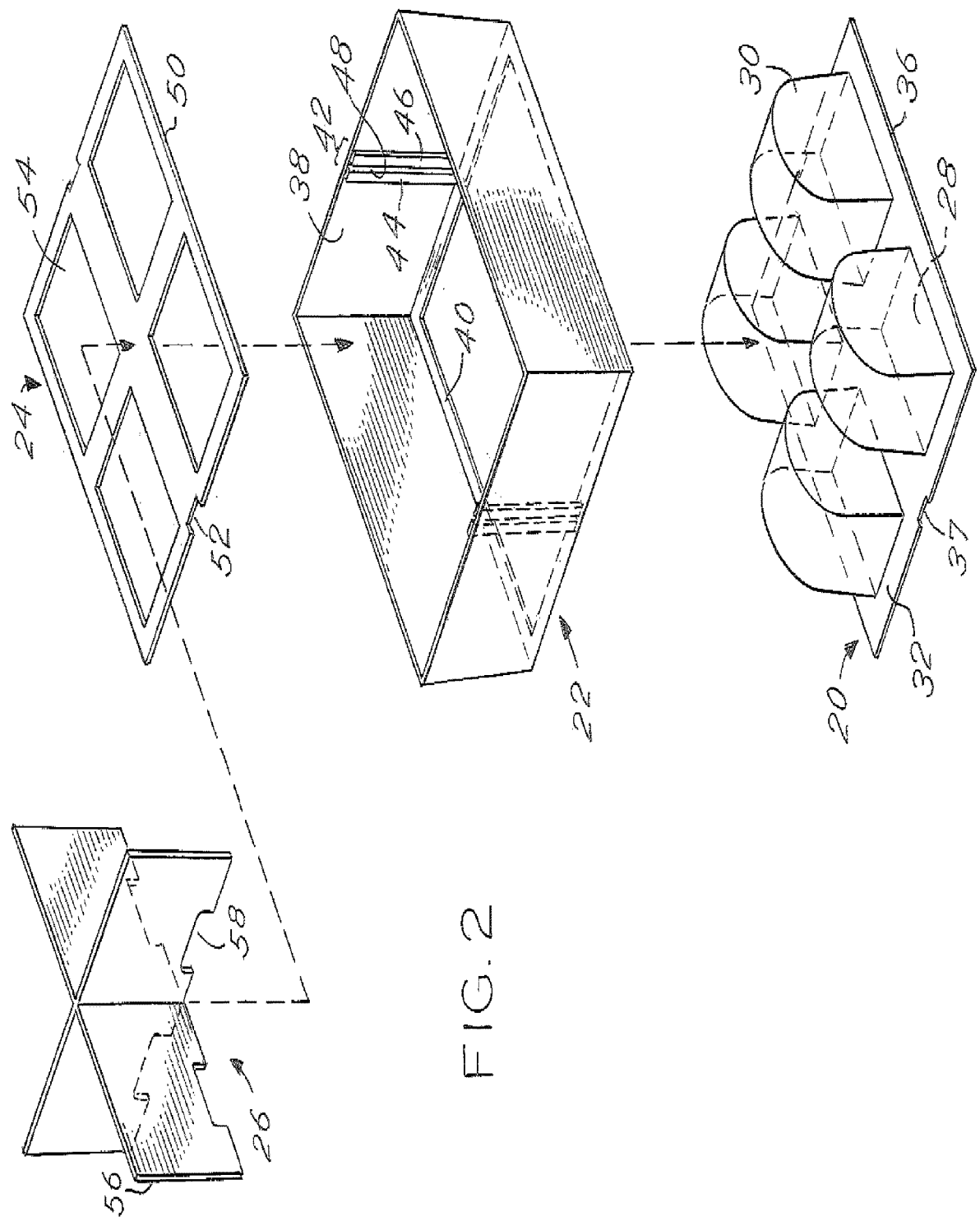
FIG. 2 is an exploded view of the pan of FIG. 1.

Pan 10 is formed from a group of nestable parts: a base plate 20, a housing 22, an ejection plate 24 and a divider 26, as shown assembled in FIG. 1 and in exploded view in FIG. 2. Base plate 20 is a generally flat plate having an aperture 28 passing therethrough and spaced inwardly from an outer edge 36. A male mold 30 extends from a top side 32 of base plate 20. Male mold 30 circumscribes aperture 28, such that male mold 30 defines a cavity 34 having an opening defined by aperture 28 (cavity 34 shown in FIG. 4). Male mold 30 is preferably tapered such that a cross-section of male mold 30 taken parallel to and proximate base plate 20 is larger than a cross-section of male mold 30 taken near the upper end. Male mold 30 is tapered to aid in ejecting bun 12 from pan 10. As shown in FIGS. 1-3, male mold 30 has a generally rectangular cross-section, though other cross-sections are suitable, see, for example, FIGS. 5-8 (round cross-section), FIG. 9 (octagon cross-section), and FIG. 10 (oval cross-section). Base plate 20 may include a single aperture 28/mold 30 combination, such as for preparing a single pocket bun 12, or alternatively may include an array of aperture 28/mold 30 combinations (as shown in FIG. 2), such as for preparing multiple pocket buns 12 using a single pan 10, or for preparing a single bun 12 having multiple cavities 16 (as shown in FIG. 15).

Housing 22, as shown in FIG. 2, is formed having an upright wall 38 defining an interior space, with a lip 40 extending inwardly from and inscribing the lower end of upright wall 38. When pan 10 is assembled, lip 40 overlies base plate 20. As shown in FIGS. 3 and 4, upright wall 38 is tapered such that the upper end is wider than the lower end, to ease removal of pocket bun 12 from pan 10. A guide 42 is positioned on the interior face of upright wall 38, with the guide formed from a first rail 44 and a second rail 46. First rail 44 is positioned generally vertically, and second rail 46 is offset from, and generally parallel to first rail 44. Rails 44, 46 are offset from one another such that a gap 48 is formed therebetween. The embodiment of housing 22 shown in FIG. 2 includes a pair of guides 42 positioned on facing surfaces of upright wall 38. In other embodiments, the number and positioning of guides 42 is variable depending on the number and positions of the aperture 28/mold 30 pairs of base 20. In additional embodiments, guides 42 are omitted from housing 22. It is contemplated that base 20 includes notches 37, such that base 20 is alternatively positionable sandwiched between housing 22 and ejector plate 24 with notches 37 locating base 20 relative housing 22.

Ejection plate 24 is defined as a generally flat plate having an outer edge 50. With pan 10 assembled, ejection plate 24 overlies lip 40 of housing 22. A notch 52 forms an indentation in edge 50, with notch 52 sized to straddle guide 42 when pan 10 is assembled, thereby notch 52 locates ejection plate 24 relative housing 22, as shown in FIG. 3. Ejection plate 24 includes an aperture 54 formed therethrough, aperture 54 is sized at least as large as the largest cross-section of mold 30, such that aperture 54 encircles mold 30 when pan 10 is assembled.

Divider 26 is defined as an upright plate overlying ejection plate 24 and subdividing the interior of housing 22 into multiple chambers. In the embodiments shown in FIGS. 2 and 8 divider 26 is X-shaped, with four plates joined together at the intersection formed therebetween. With pan 10 assembled, an outer edge 56 of divider 26 is located at gap 48 between first rail 44 and second rail 46 of guide 42, such that guide 42 retains divider 26 at a specified position within housing 26. Divider 26 includes a gap 58 formed at the bottom edge of divider 26. FIGS. 3 and 7 show a top view of pan 10 as assembled, where divider 26 is used to subdivide the pan into four quadrants, with each quadrant forming a chamber suitable for baking a pocket bun 12. Gap 58 provides an opening between adjacent chambers to allow adjacent pocket buns 12 to be joined together, such as to aid in keeping groups of pocket buns 12 together during processing or shipping. Gap 58 may be positioned at any of many suitable positions on divider 26, such as at the outer corners of divider 26 or at the intersection between the plates, or spaced between the corners and intersection as is shown in FIG. 2. It is contemplated that gap 58 may be omitted, thereby providing a pan 10 which completely segregates buns 12.

It is contemplated, such as is shown in FIGS. 13 and 14, that divider 26 is shaped other than as an X to form buns of different shapes. It is also contemplated that divider 26 may be omitted and the resulting buns may be sliced into individual buns in a separate step. It is contemplated that gap 58 is omitted such that divider 26 forms a complete partition between adjoining chambers.

FIG. 3 is a top view of pan 10 showing ejection plate 24 overlying lip 40 of housing 22 (lip 40 shown in dotted line). Notch 52 of ejection plate 24 locating ejection plate 24 in house 22 relative guide rails 44, 46. Male molds 30 are shown extending up through ejection plate 24. It is contemplated that ejection plate 24 may be omitted.

FIG. 4 shows a side view of pan 10. Pocket bun 12 is shown in pan 10. FIG. 4 shows how the constituent parts of pan 10 stack together, with divider 26 overlying ejection plate 24, ejection plate 24 overlying lip 40 of housing 22, and lip 40 overlying base 20. Male mold 30 extends upwardly through ejection plate 24 into housing 22.

Referring now to FIGS. 5-8, in one embodiment pan 10 is shaped to form a bun 12 suitable for carrying a hotdog and associated condiments. As will be appreciated by comparing FIG. 1 and FIG. 5, each embodiment includes the same constituent parts: base 20, housing 22, ejection plate 24 and divider 26, the main difference being the relative dimensions and shape of the parts. For example, housing 22 of FIG. 5 is generally taller than that of FIG. 1 to allow for the forming of a long bun shaped to carry a hotdog. Similarly, male mold 30 of FIG. 5 has a circular cross-section to accommodate a hotdog.

FIG. 8 shows an exploded view of the constituent parts of the pan 10 of FIG. 5. FIG. 8 shows housing 22 and lip 40, with lip 40 contoured to match the shape of male molds 30. Base 20 includes spacers 60 which serve to locate housing 22 on base 20. Spacers 60 are raised bosses or strips extending from the surface of base 20 which contact the outer wall of housing 22 when pan 10 is assembled. FIG. 1 shows an embodiment of pan 10 which omits spacers 60. It is envisioned that pan 10 of FIG. 1 could be modified to include a spacer 60 by enlarging the dimensions of base 20. Likewise, it is envisioned that pan 10 of FIG. 8 could be modified to omit spacer 60.

FIG. 6 shows a cross-sectional side view of the embodiment of pan 10 showing how the constituent parts overly one another in assembled form. FIG. 6 is comparable to FIG. 4. Similarly, FIG. 7 is comparable to FIG. 3 in showing a top view of the respective embodiments of pan 10.

FIGS. 9 and 10 show alternative shapes of male mold 30. FIG. 9 shows male mold 30 having an octagon-shaped cross-section. FIG. 10 shows male mold 30 having an oval-shaped cross-section. As is clear from FIGS. 9 and 10, male mold 30 is formable in any one of many possible cross-sectional shapes, which in turn forms the internal cavity of pocket bun 12 in the corresponding shape. As such, the shape of male mold 30 can be customized to allow for a specific type of food, or to allow for distinctive marketing or branding. The shape of male mold 30 may be customized on either the hamburger or hotdog accommodating bun pans. The cross-sections shown herein are merely illustrative, and should not be viewed as limiting. Such cross¬-sections are preferably polygon shaped. Such cross-sections are more preferably equi-angular polygons such as: triangle, square, pentagon, hexagon, heptagon, or octagon. Other shapes which provide brand-identification are suitable.

Figure 11:
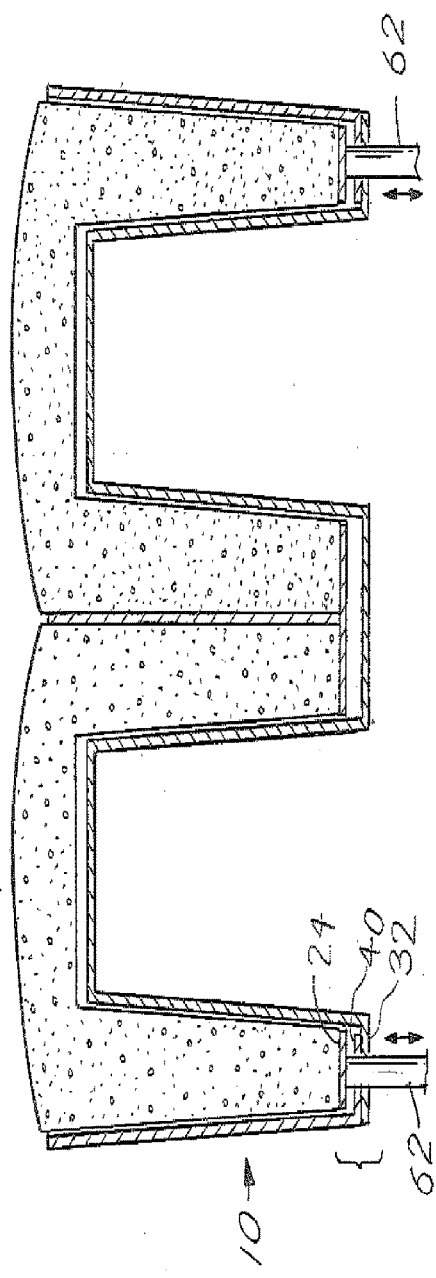
FIG. 11 is a sectional side view of the pan of FIG. 1 and showing the ejector pins.

FIG. 11 shows a sectional side view of pan 10, showing an auto-ejection system having ejection pins 62. Ejection pins 62 pass through apertures in base 20 such that when actuated, ejection pins 62 apply a force to ejection plate 24, to force bun 12 away from pan 10. Ejection pins 62 may be mechanically, pneumatically, electrically, manually, or otherwise actuated. Alternatively, ejection plate 24 is omitted and ejection pins 62 force housing 22 away from base 20, and housing 22 urges bun 12 out of pan 10. It is contemplated that base plate 20 is carried above lip 40 of housing 22, such that pin 62, when actuated, forced base 20 up and away from housing 22. Additionally, it is contemplated that pin 62, when actuated, contacts bun 12 directly, causing bun 12 to come free from pan 10.

Figure 12:
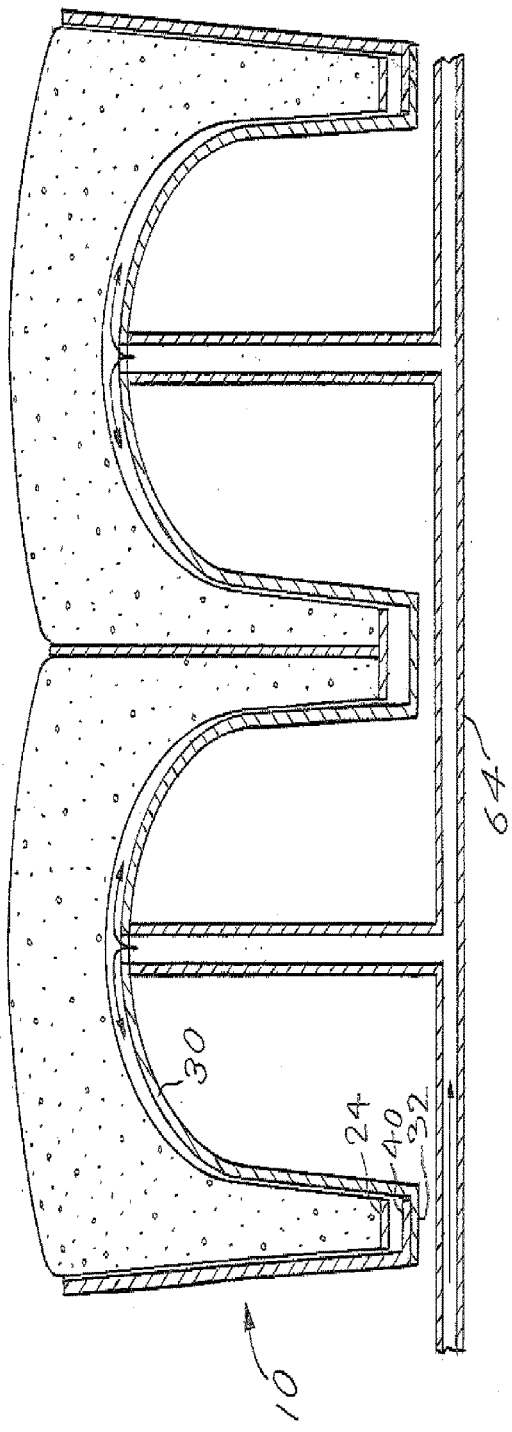
FIG. 12 is a sectional side view of the pan of FIG. 10, and showing an alternative ejector system.
Figure 17:
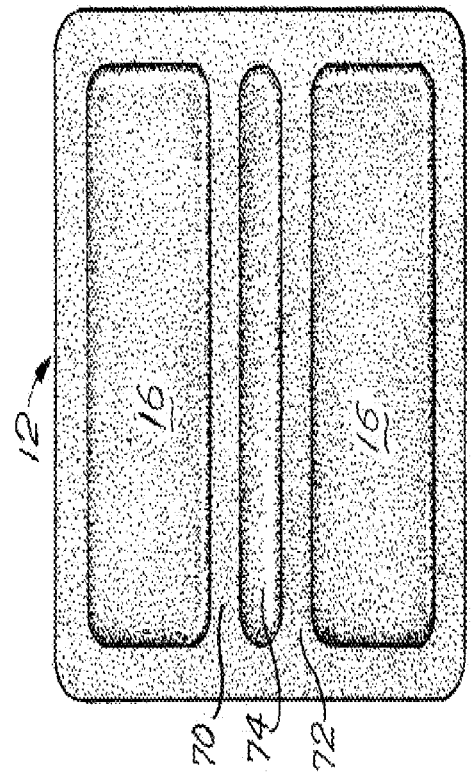
FIG. 17 is a top view of a bun having two cavities and an insulating wall.
Figure 18:
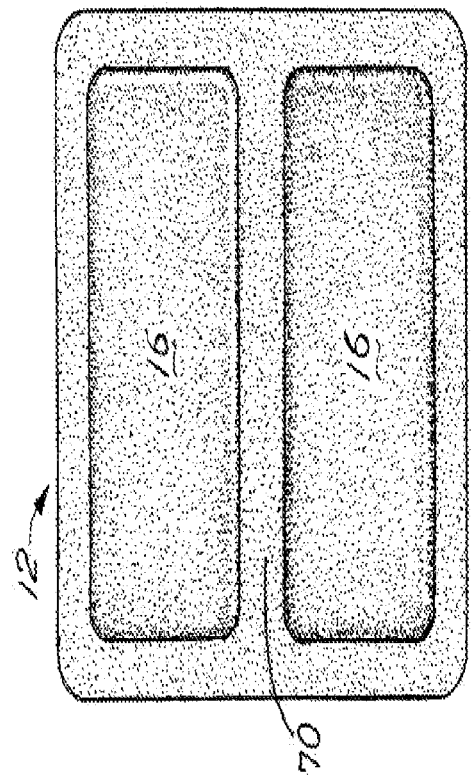
FIG. 18 is a top view of a bun having a cavity in the insulating wall.

FIG. 12 shows a sectional side view of pan 10 having an air manifold 64 for providing a pneumatic release system to pan 10, whereby air is used to force bun 12 free from pan 10. Manifold 64 is in fluid communication with apertures in male mold 30, such that when activated, air forces bun 12 away from pan 10. It is contemplated that ejector plate 24 may be omitted where manifold 64 is used to eject bun 12 from pan 10.

FIGS. 13 and 14 show alternative shapes of divider 26, such as to form a pocket bun 12 having an octagon-shaped outer cross-section (as in FIG. 13), or a pocket bun 12 having an oval-shaped outer cross-section (as in FIG. 14). The shape of divider 26 may be selected to yield the outer cross-section desired for a given pocket bun 12. The outer cross-section and cavity cross-section of pocket bun 12 may each be independently selected to yield a pocket bun 12 having desired characteristics, such as for brand identification or similar distinctive aesthetic enhancement of bun 12. The cross-sections shown herein are merely illustrative, and should not be viewed as limiting. Such cross-sections are preferably polygon shaped. Such cross-sections are more preferably equi-angular polygons such as: triangle, square, pentagon, hexagon, heptagon, or octagon. Other shapes which provide brand-identification are suitable.

In one embodiment, a bun is formed having a pair of inner chambers. This embodiment is useful for building a three-layer sandwich, such as bun-filling-bun-filling-bun, as is common at some fast food restaurants. An example of this embodiment is shown in FIGS. 15 and 16. Here, pan 10 includes a pair of male molds 30 without a divider between them such that a bun 12 is formed having a pair of cavities. As shown in FIG. 16, the bun includes a surrounding wall which defines a first cavity and a second cavity. The cavities are separated by a dividing wall. The surrounding wall and the dividing wall are formed from a single portion of bread. The cavities extend into the bun such that the cavities extend generally parallel with each other into the bun. As the buns are nested in the pan, the cavities have openings which are oriented toward the bottom of the bun. The bun includes an outer surface, which outer surface is defined as the entirety of the bun which contacts the air when the bun is removed from the pan. The dividing wall, which separates the two cavities, defines a portion of the outer surface. The entire outer surface is browned. The dimensions shown in FIG. 16 are merely illustrative, the dimensions of bun 12 (such as the thickness of wall 14 or the relative size of cavity 16) may be varied according to the type of bun which is desired. The same can be said for a bun formed having a single cavity.

One advantage of bun 12 formed by pan 10 over prior art breads is that pan 10 forms a bun where both the outer surface and the cavity surface of bun 12 has a browned surface. Most buns, for example a common hamburger bun, have a browned outer surface, but the inner surface is not browned, but is formed by splitting the bread open. The present bun 12 includes an inner cavity having a browned surface such that when a filling is placed in the bun the filling contacts a browned surface and the browned surface serves to minimize the bread becoming soggy by resisting absorption of moisture from the filling. In this way, pan 10 bakes a bun 12 which resists becoming soggy.

The outer surfaces 13, 15, and 17 of bun 12 are browned either by direct contact from heated air when baking (such as is the case at the open top of pan 10), or by conductive heat transferred from pan 10 to the bun. Base plate 20 includes apertures 28 through which heated air enters the internal cavity of male mold 30, such that male mold 30 is heated during baking so as to brown the inner cavity 16 of bun 12. Browning the inner cavity 16 of bun 12 provides the beneficial effect of forming a filling-accepting portion of bun 12 which is resistant to becoming soggy.

Pan 10 is formed from a material sufficient at least to withstand the heat of baking, to retain shape when baking, and to transfer heat to brown bun 12 when baking. Such materials include, but are not limited to, aluminum, steel and other metals, silicone, tempered glass, ceramic, or composite. Any of such materials may include a non-stick coating.

Pan 10 is formed having an open top wherein the open top allow gases to escape from the pan when bun is being baked.

Figure 19:
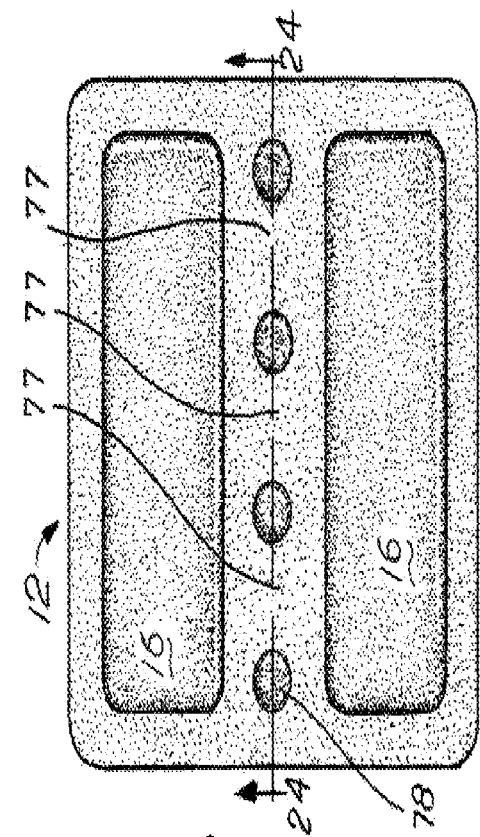
FIG. 19 is a top view of an additional embodiment of the bun.
Figure 20:
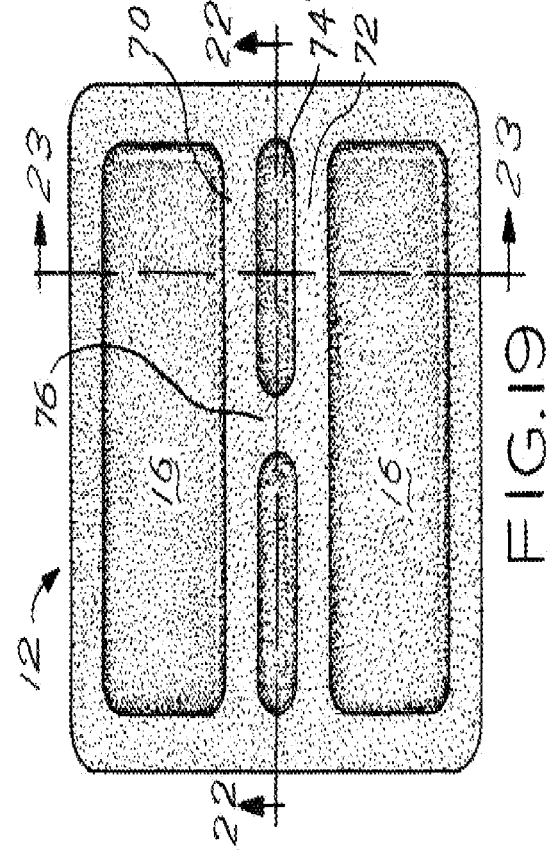
FIG. 20 is a top view of an additional embodiment of the bun.
Figure 25:
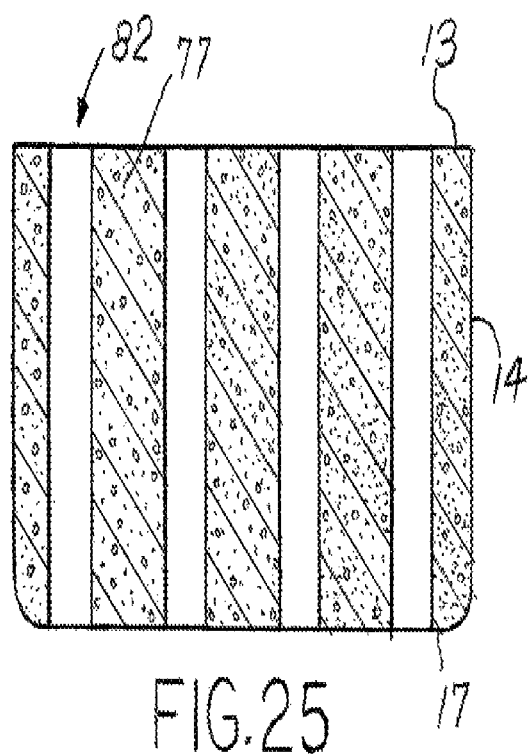
FIG. 25 is a section view 24-24 of the bun in FIG. 20 with through-holes in the insulating wall instead of pockets.

The bun 12 has an insulating wall 70, shown in FIGS. 16-20 and 22-23. The insulating wall 70 completely separates adjacent inner cavities 16 and provides an insulation barrier to prevent or reduce heat transfer from one of the cavities 16 into the other cavity 16. The cavities 16 have a bottom surface 68 that is formed by the terminal surface of the male mold 30. Baked bread has some insulating qualities due to the nature of trapped air pockets located therein, but the user may desire to have better insulating properties by implementing the embodiments. By separating the cavities 16 and including features therebetween, the temperature transfer from fillings in one cavity 16 may be decreased to the fillings in another cavity 16. The insulation wall 70 may be thicker than the wall 14 that makes up the outside of the bun 12. As shown in the embodiment in FIG. 18, a second insulating wall 72 may create an insulating cavity 74 that further prevents heat from transferring from one cavity 16 to an adjacent cavity 16. The insulating cavity 74 provides an additional barrier to heat transfer. The bun 12, as shown in FIG. 19, includes a bridge wall 76 to split the insulating cavity 74 into two cavities and provide support between the insulating walls 70 and 72. Another embodiment of the insulating wall 72 is shown in FIG. 20. This embodiment has a series of circular insulating cavities 78 that extend into the bun 12. The insulating cavity 74 has a bottom surface 80 that may extend to be co-planar with the bottom surface 68 of the cavities. It is further contemplated that the insulating cavities extend completely through the bun 12 to further insulate the cavities. One example of through-holes 82 is shown in section view FIG. 25. The through-holes 82 extend from flat surface 13 to end surface 17. The cavities 16 remain mechanically coupled through a series of bridge walls 77, but the through-holes 82 further insulate the cavities 16. The embodiment of the bun 12 shown in FIG. 20 could use insulating cavities 78 with a closed bottom or have through-holes 82.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A single piece, multi-cavity insulating bun comprising:
a body formed from baked bread having a continuous outside wall, said body has a first opening defining an open mouth to a first cavity and a second opening defining an open mouth to a second cavity, said end surface oppositely located from said first and second openings, said first cavity for receiving and retaining a first filling, said second cavity for receiving and retaining a second filling;
an insulating wall located directly between and separating said first cavity from said second cavity, said insulating wall aligned with said body, said insulating wall continuously extending between opposing sides of said outside wall to separate said first and second cavities, said insulating wall for impeding thermal transfer between fillings in said first cavity and said second cavity;
said insulating wall has an insulating cavity contained within and spaced from said outside wall, said insulating cavity extending toward said end surface, said insulating cavity having an interior surface and terminating before said end surface, said insulating cavity separate from and located directly between said first cavity and said second cavity; and
said first and said second cavities forming distinct chambers in said bun separated by said insulating wall and said insulating cavity within said insulating wall, said insulating wall extends from one opposing end to another opposing end, said first and second cavities having an inside surface, said outside wall being free of said insulating cavity.

2. The bun of claim 1, wherein said insulating cavity is centered in a thickness of said insulating wall between said first and second cavities.

3. The bun of claim 2, wherein said insulating wall has a plurality of said insulating cavities.

4. The bun of claim 1, wherein said cavities having positive draft with respect to each of said openings.

5. The bun of claim 4, said first and second cavities having a depth defined by a distance between each said opening and a corresponding closed bottom in each cavity, each of said openings having a width defined by the largest distance between opposing edges of said mouth, said depth being larger than said width.

6. A single piece, multi-cavity insulating bun comprising:
a body formed from baked bread having a continuous outside wall with an end surface, a flat surface, and a side surface extending therebetween, said end surface opposite of and spaced from said flat surface, said flat surface has a first opening defining an open mouth to a first cavity and a second opening defining an open mouth to a second cavity, said first cavity for receiving and retaining a first filling, said second cavity for receiving and retaining a second filling, said first cavity being separate from said second cavity;
an insulating wall located directly between and separating said first cavity from said second cavity, said insulating wall having a flat surface aligned with said flat surface on said body, said insulating wall continuously extending between opposing sides of said outside wall to define said first and second cavities, said insulating wall for impeding thermal transfer between said first cavity and said second cavity;
said insulating wall having an insulating cavity located directly between said first and said second cavity, said insulating cavity extending from said flat surface toward said end surface, said insulating cavity spaced from said outside wall, said side surface being free of said insulating cavity; and
said first and second cavities forming distinct chambers in said bun separated by said insulating wall and said insulating cavity, said insulating wall extends from one opposing end to another opposing end, said cavities having an inside surface intersecting said flat surface at said opening.

7. The bun of claim 6, wherein said insulating cavity extends through said end surface.

8. The bun of claim 7, wherein said insulating wall has a plurality of said insulating cavities.

9. The bun of claim 6, wherein said insulating cavity is centered in a thickness of said insulating wall between said first and second cavities.

10. The bun of claim 6, wherein said insulating wall is thicker than said outside wall.

11. The bun of claim 6, wherein said cavities having positive draft with respect to said flat surface, said body having an outside surface intersecting said flat surface and having negative draft with respect to said flat surface.

12. The bun of claim 11, said first and second cavities having a depth defined by the distance between said flat surface and a closed bottom, each of said openings having a width defined by the largest distance between opposing edges of said mouth, said depth being larger than said width.

13. The bun of claim 6, wherein said first filling is a meat patty or sausage.

14. The bun of claim 13, wherein said second filling is condiments, vegetables, or sauce.

15. A single piece, multi-cavity insulating bun comprising:
a body formed from baked bread having a continuous outside wall, said body having a first and second opening opposite of and spaced from an end surface, said body having a side surface extending from said end surface towards said first and second openings, said first opening defining an open mouth to a first cavity and said second opening defining an open mouth to a second cavity, said first cavity for receiving and retaining a first filling, said second cavity for receiving and retaining a second filling, said first cavity being separate from said second cavity;

an insulating wall located directly between and separating said first cavity from said second cavity, said insulating wall having a surface aligned with said surface on said body, said insulating wall continuously extending between opposing sides of said outside wall to define said first and second cavities, said insulating wall for impeding thermal transfer between said first and said second cavities;

said insulating wall having an insulating cavity located directly between said first and said second cavity, said insulating cavity extending toward said end surface, said insulating cavity spaced from said outside wall, said side surface being free of said insulating cavity; and said first and second cavities forming distinct chambers in said bun separated by said insulating wall and said insulating cavity, said insulating wall extends from one opposing end to another opposing end, said first, second, and insulating cavities each having an inside surface intersecting said surface at said opening.

* * * * *